(12) United States Patent
Roovers et al.

(10) Patent No.: US 7,814,800 B2
(45) Date of Patent: Oct. 19, 2010

(54) METHOD AND DEVICE FOR MEASURING THE CHAIN FORCE IN A BICYCLE

(75) Inventors: Gijsbertus Cornelis Franciscus Roovers, Goirle (NL); Bastiaan Andreas D'Herripon, Goirle (NL)

(73) Assignee: IDBIKE C.V. (NL)

( * ) Notice: Subject to any disclaimer, the term of this patent is extended or adjusted under 35 U.S.C. 154(b) by 403 days.

(21) Appl. No.: 11/817,308

(22) PCT Filed: Feb. 27, 2006

(86) PCT No.: PCT/NL2006/000103

§ 371 (c)(1),
(2), (4) Date: Aug. 28, 2007

(87) PCT Pub. No.: WO2006/091089

PCT Pub. Date: Aug. 31, 2006

(65) Prior Publication Data

US 2009/0120211 A1    May 14, 2009

(30) Foreign Application Priority Data

Feb. 28, 2005    (NL) .................................... 1028426

(51) Int. Cl.
*G01N 3/08*    (2006.01)
(52) U.S. Cl. .......................................... 73/828; 73/760
(58) Field of Classification Search ............ 73/760–828
See application file for complete search history.

(56) References Cited

U.S. PATENT DOCUMENTS

| | | | |
|---|---|---|---|
| 5,167,159 A | 12/1992 | Lucking | |
| 5,681,234 A | 10/1997 | Ethington | |
| 6,047,230 A | 4/2000 | Spencer et al. | |
| 6,418,797 B1 * | 7/2002 | Ambrosina et al. | 73/862.29 |
| 7,047,817 B2 * | 5/2006 | Lanham | 73/773 |
| 7,493,827 B2 * | 2/2009 | Madden et al. | 73/779 |
| 2007/0099735 A1 * | 5/2007 | Roovers et al. | 474/101 |

FOREIGN PATENT DOCUMENTS

| | | |
|---|---|---|
| EP | 1082592 | 11/2005 |
| GB | 1504121 | 3/1978 |
| GB | 2341364 | 3/2000 |
| JP | 11079059 | 3/1999 |
| WO | WO01/30643 | 5/2001 |
| WO | WO03/073057 | 9/2003 |
| WO | WO2004/111591 | 12/2004 |

OTHER PUBLICATIONS

International Search Report for PCT Application No. PCT/NL2006/000103 dated Jul. 13, 2006.

\* cited by examiner

*Primary Examiner*—Max Noori
(74) *Attorney, Agent, or Firm*—Ryan A. Schneider, Esq.; Troutman Sanders LLP

(57) ABSTRACT

A method is described for measuring the chain force (FK) in a drive chain (26) engaging on a body (20) that is rotatable around an axle (21) which is fixed in a frame (10) at least two connecting points (22, 23). The method comprises the steps of: measuring the reaction force (FL) between axle (21) and frame (10) at a first connecting point (22); measuring the reaction force (FL) between axle (21) and frame (10) at a second connecting point (23); and adding the two measured reaction forces (FL; FR).

40 Claims, 13 Drawing Sheets

METHOD AND DEVICE FOR MEASURING THE CHAIN FORCE IN A BICYCLE

BENEFIT CLAIMS

This application is a US National Stage of International Application No. PCT/NL2006/000103, filed 27 Feb. 2006, which claims the benefit of NL 1028426, filed 28 Feb. 2005.

The present invention relates in general to measuring forces. The present invention particularly relates to measuring the force present in the drive chain of a bicycle, and therefore, the present invention will hereinafter be further explained specifically for this application. However, it is stated with emphasis that the invention is not limited hereto. Drive chains are also applied in other vehicles. Further, it is possible that a belt or a string or the like is applied instead of a chain. Further, it is possible that the chain is not used to drive a vehicle, but that energy is transferred for another reason, for example for driving a generator, a tool, or that it concerns a training apparatus such as for example a home-trainer, spinning bike, etc.

An important field of application of the present invention is the field of the electrically supported bicycle, also briefly indicated as electrical bicycle. An electrically supported bicycle is a bicycle with an electrical auxiliary motor, wherein the user drives the bicycle by exerting pedal force, an wherein the auxiliary motor exerts an auxiliary drive force that depends on the exerted pedal force: the larger the pedal force, the larger the auxiliary drive force exerted by the auxiliary motor. Since electrically supported bicycles are known per se, it is not necessary here to give a more extensive discussion thereof. It suffices to note that the auxiliary motor needs an input signal indicative for the magnitude of the exerted pedal force, or at least indicative for the magnitude of the drive force present in the chain.

Another important field of application of the present invention is the field of the bicycle with automatically shifting gear mechanism. Such bicycles are known per se as well. With such bicycles, a gear is typically chosen based on the driving speed: at fixed, predetermined speeds it shifts up to a higher gear or shifts down to a lower gear. It is desired that the characteristic of the shift points is adapted relating to the force supplied by the cyclist: as he gives more force (for example on a sloping road, or into the wind) it is desired that shifting up to a higher gear only takes place at a higher speed, in order to prevent the cyclist from not being able to produce the required pedal force in the higher gear. Also in this case, a gear mechanism needs an input signal that is indicative for the magnitude of the exerted pedal force, or is at least indicative for the magnitude of the drive force present in the chain.

In the past, proposals have already been made to come to measuring signals that are indicative for the magnitude of the drive force present in the chain. In this context, reference is made to for example WO-01/30643; the invention described in this application is based on the observation that the bicycle frame as a whole undergoes some deformation when a cyclist exerts a pedal force, and a measuring signal is obtained by measuring a deformation of the bicycle frame. Further, reference is made to WO-03/073057; this application describes a measuring bush for measuring the bending of the driven axle (rear axle) when a cyclist exerts a pedal force.

Object of the present invention is to obtain a simple and universal construction that can be implemented in a bicycle with relatively little additional costs, that does not require adaptations of the axle nor of the hub, and that is capable of providing a well-usable measuring signal.

A problem with known measuring constructions is that, with bicycles with a derailleur gear system, multiple chain wheels are arranged on the rear axle, wherein the cyclist, by choosing a gear, determines which chain wheel is in use. This means that the chain is physically brought into engagement with another chain wheel and, in doing so, is displaced in horizontal (axial) direction along the rear axle, which has consequences for the generated measuring signal. Without knowing which chain wheel is in engagement with the chain, it then is not simply possible anymore to derive the chain force from the measuring signal.

The present invention aims at solving also this problem.

According to an important aspect of the present invention, a measuring signal is generated representing the reaction force of the driven axle to the frame. In a particular embodiment, the dropout is implemented in such a way that it undergoes a measurable deformation in a predetermined direction as a result of chain forces. In another embodiment, a deformable coupling block is provided, of which one end is attached to the frame while a dropout is attached to the other end.

According to another important aspect of the present invention, the reaction force on the frame is measured on both ends of the axle. The summation of these two reaction forces will, to a good approximation, be equal to the chain force. In changing a chain wheel, the point of action of the chain force will displace along the rear axle, and the reaction force will increase on the one axle end and decrease on the other axle end, but the summation will still, to a good approximation, be equal to the chain force.

According to another important aspect of the present invention, it is detected which of the chain wheels is in engagement with the chain. To that end, the invention provides a relatively simple sensor device that detects the position of a control cable. When this position is known, it can be deducted therefrom where the chain engages on the rear axle (axial position of the driven chain wheel). When this is known, also the ratio between the reaction forces at the two axle ends is known, and it suffices to measure the reaction force at one of the axle ends: the total chain force can then be calculated from the measured force, taking said ratio into account. This has the advantage, inter alia, that a single force detector is sufficient, and that all components of the measuring system can be attached on one side of the bicycle in a compact way and with short connecting wires.

These and other aspects, features and advantages of the present invention will be further explained by the following description with reference to the drawings, in which same reference numerals indicate same or similar parts, and in which:

FIG. 1 schematically shows a top view, partially in section, of a part of a bicycle;

the FIGS. 2A and 2B show block-diagrams of an electrical energizing circuit of an electrically supported bicycle;

Figure 3A:
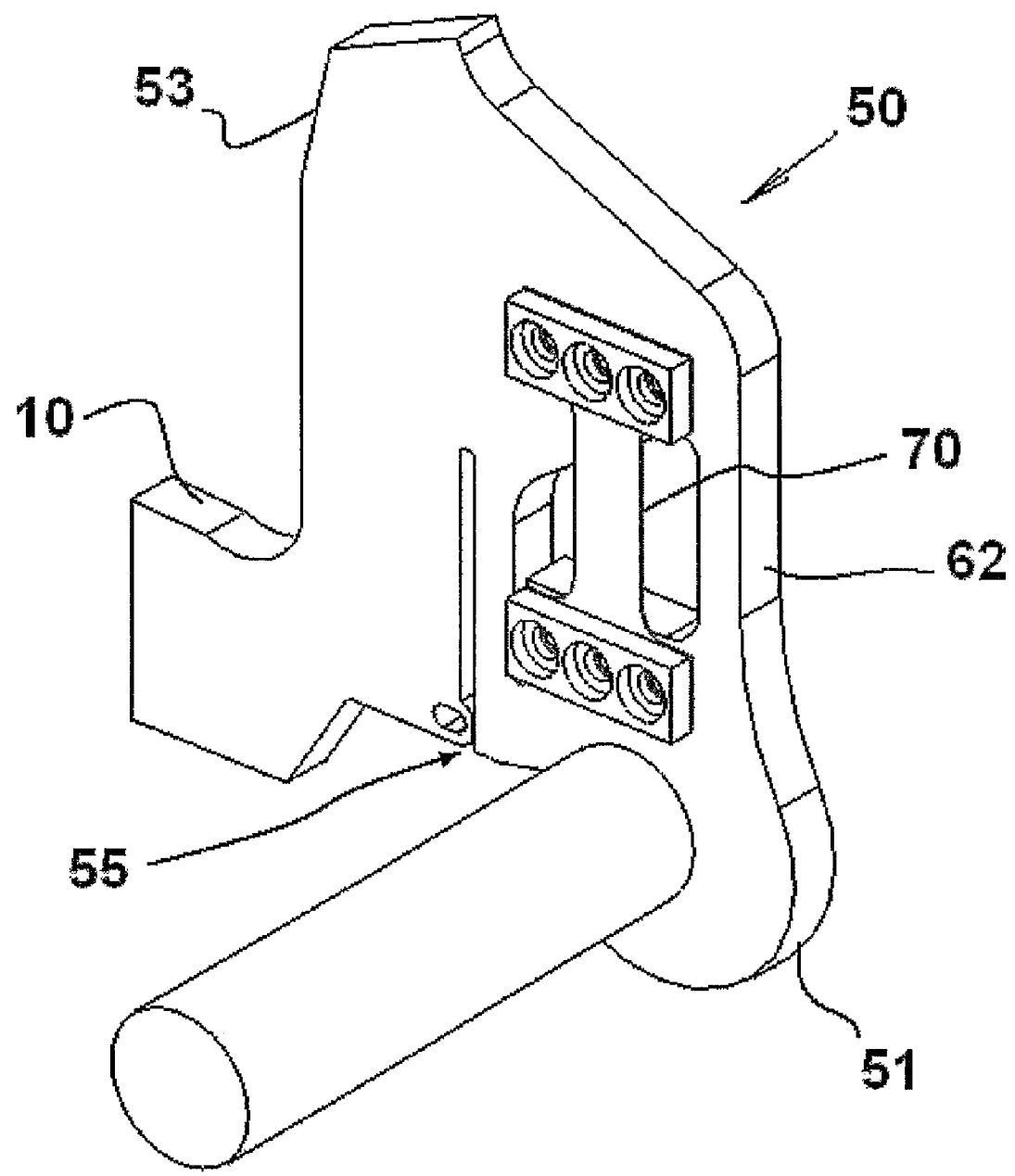
FIG. 3A shows a schematic perspective view of an embodiment of a dropout according to the present invention.
Figure 3B:
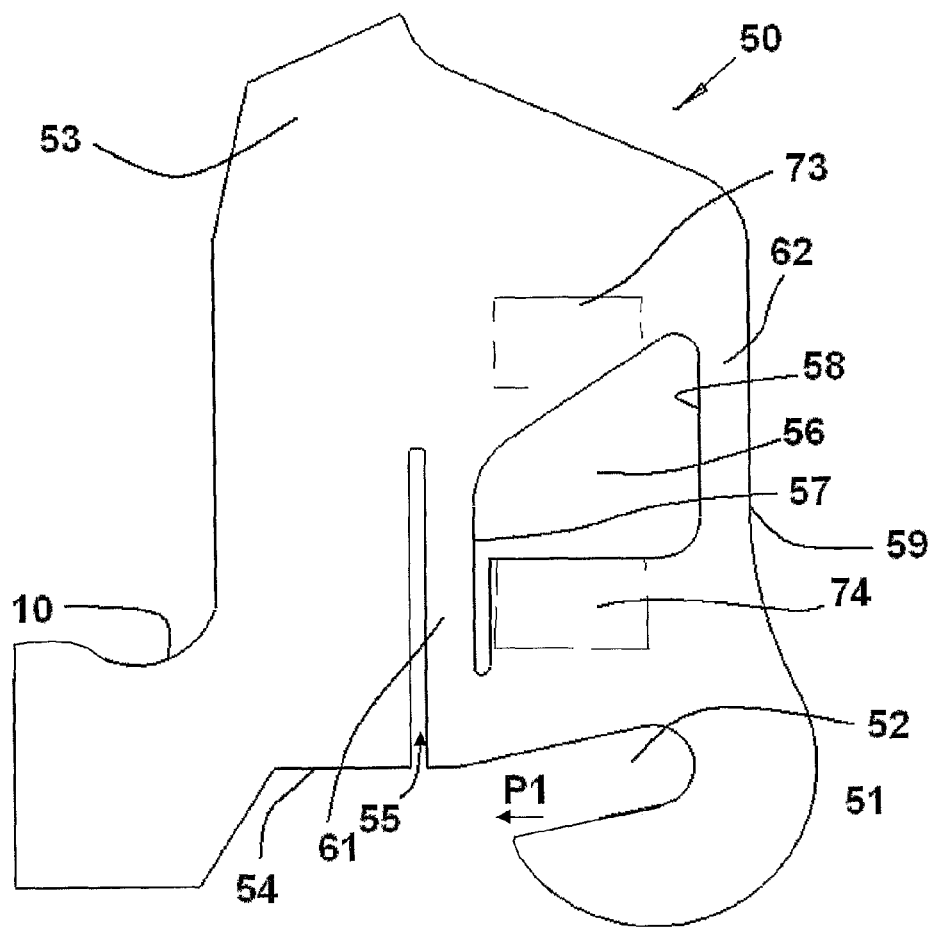
FIG. 3B shows a schematic side view of the dropout of FIG. 3A.
Figures 3C, 3D:
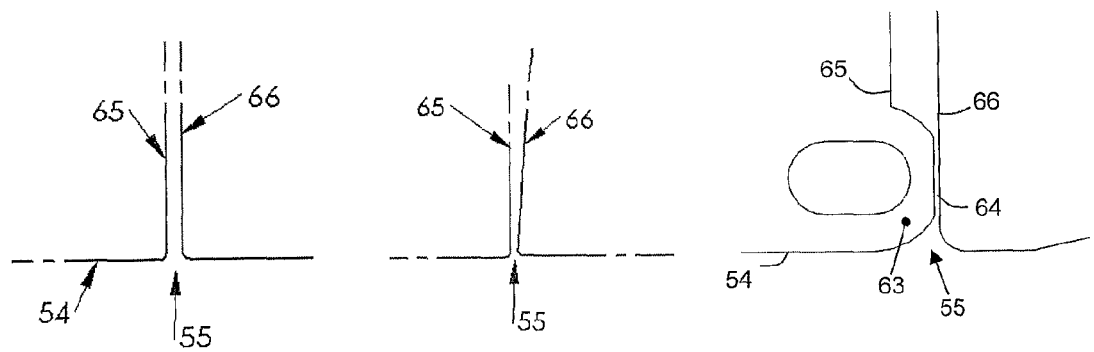
Figure 4:
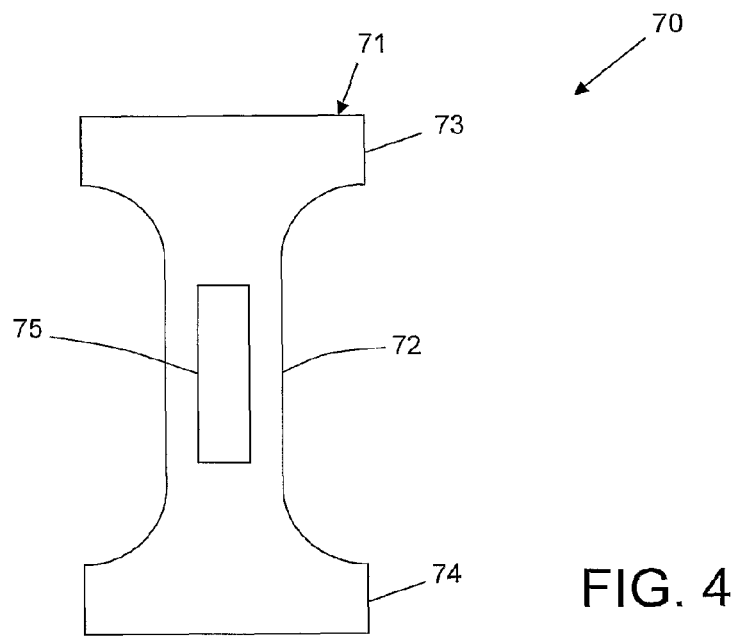
Figure 5B:
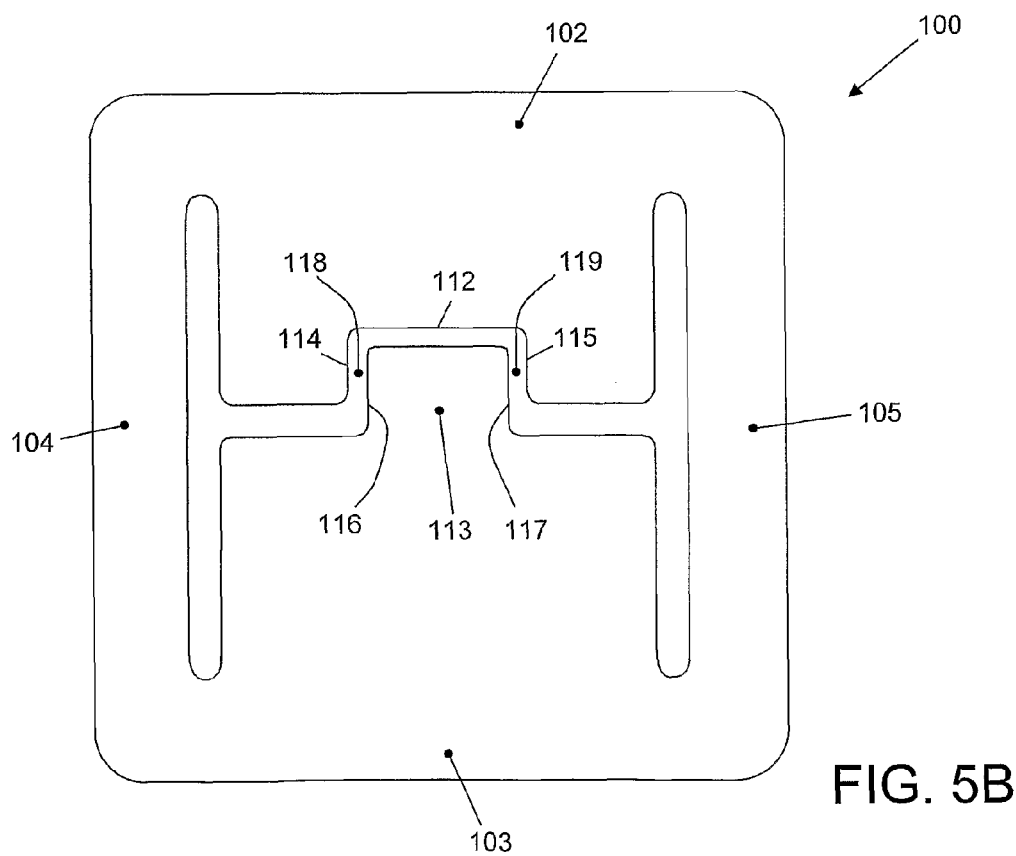
Figure 5A:
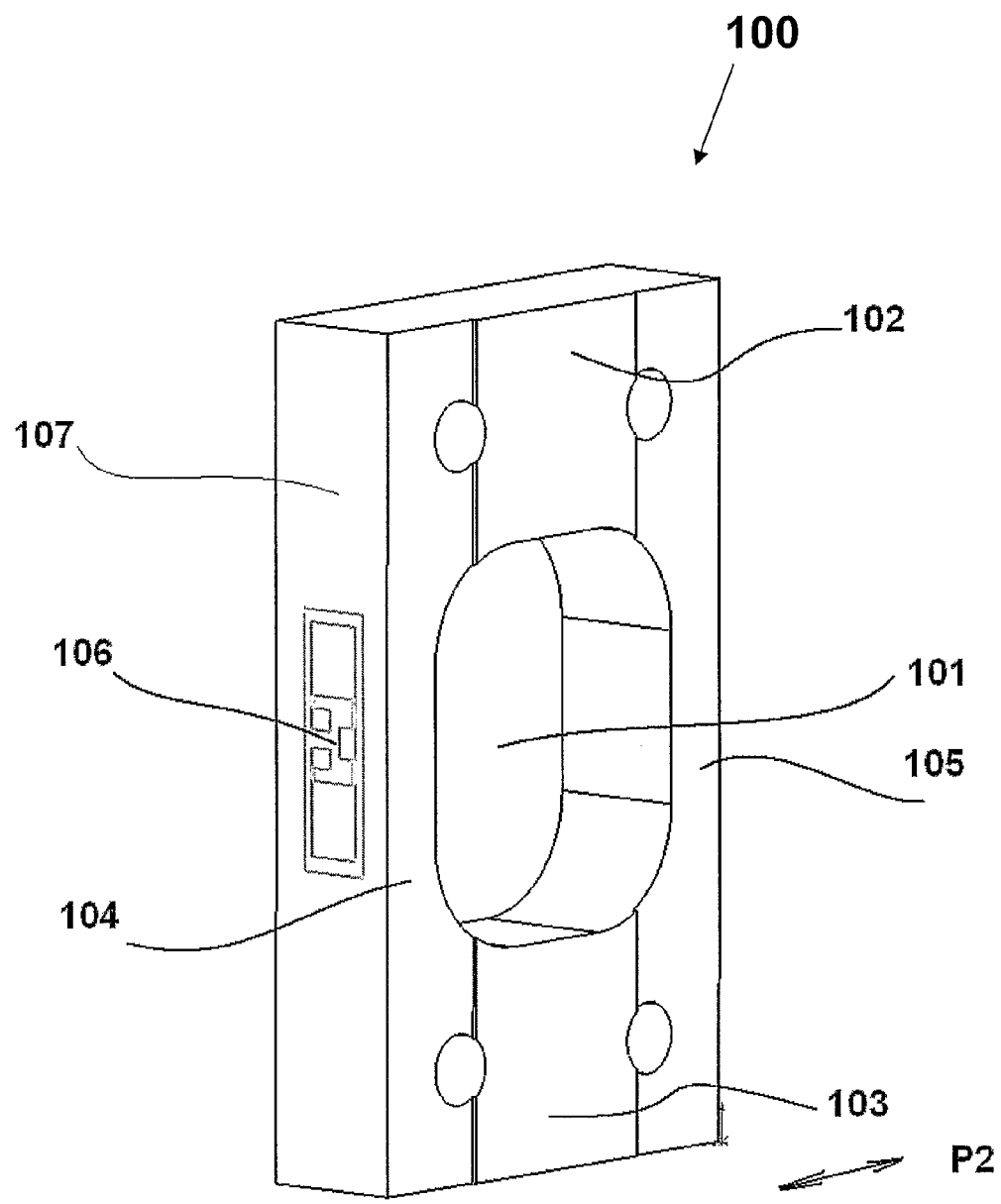
Figure 6:
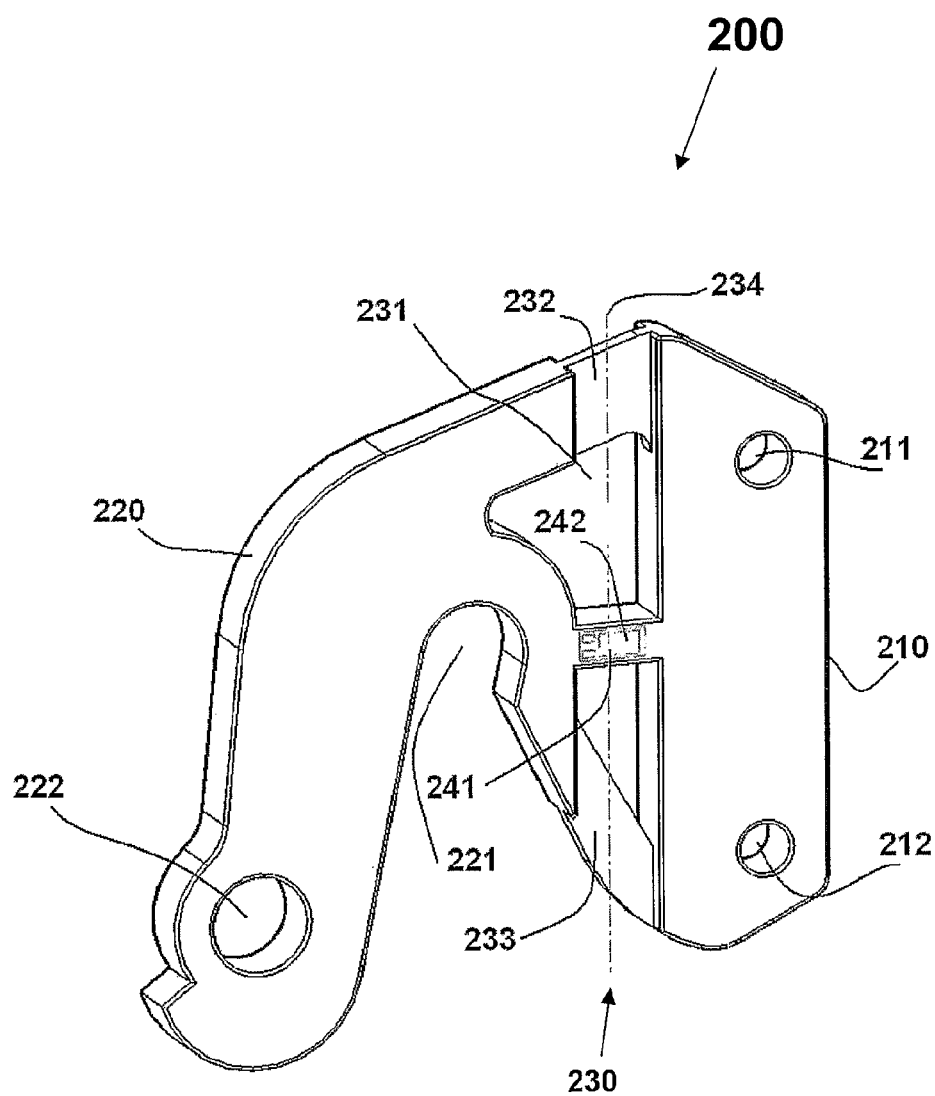

the FIGS. 3C and 3D illustrate details of the dropout of FIG. 3A;

FIG. 4 shows a schematic front view of a deformation measuring cell;

FIG. 5A shows a schematic perspective view of an embodiment of a measuring block according to the present invention;

FIG. 5B shows a schematic side view of a variation of the measuring block of FIG. 5A;

FIG. 6 shows a schematic perspective view of another embodiment of a dropout according to the present invention.

Figure 7A:
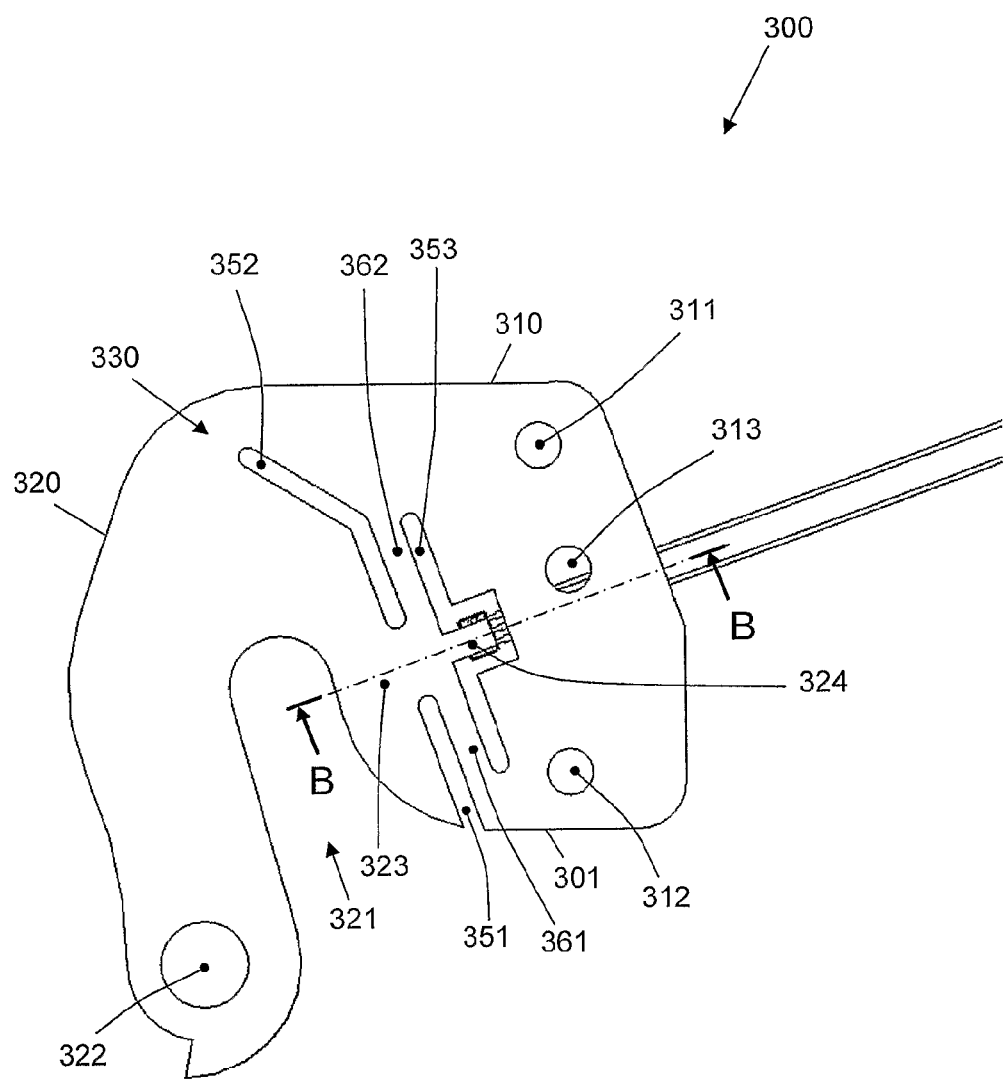
Figure 7B:
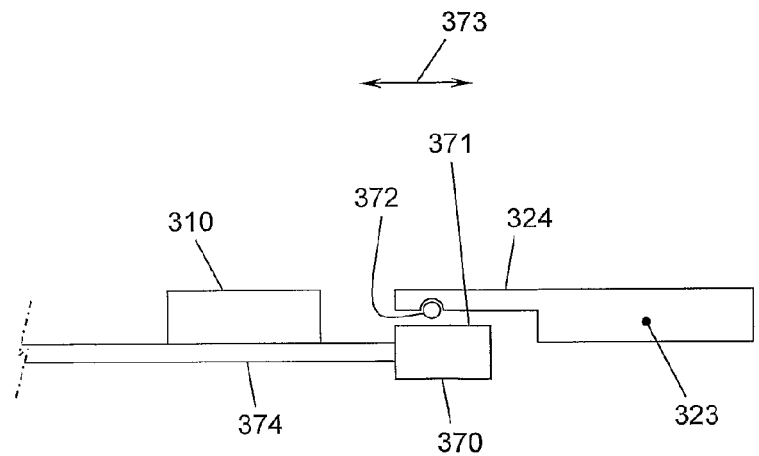
Figure 7C:
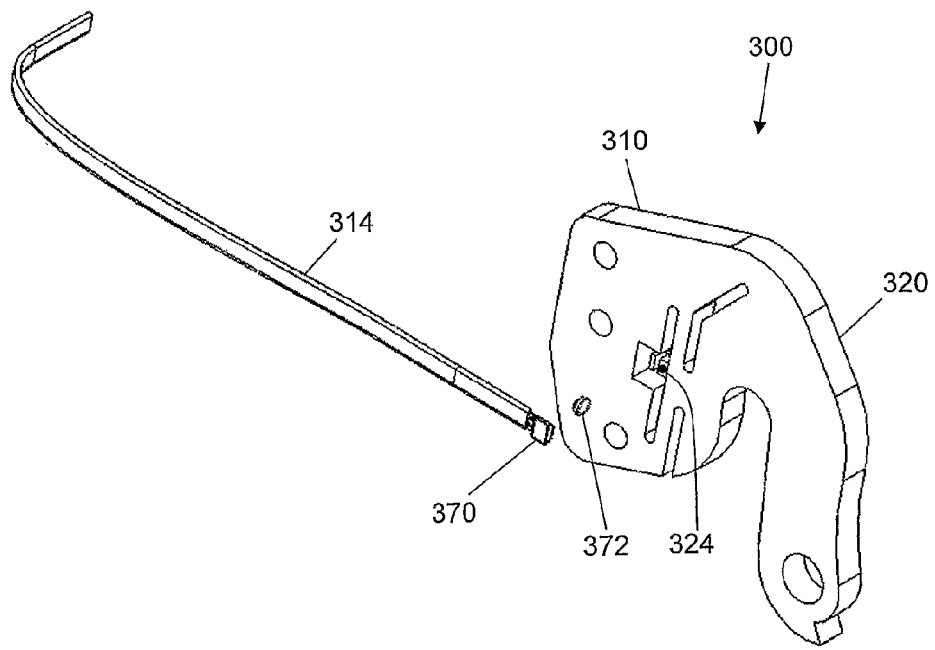
Figure 8A:
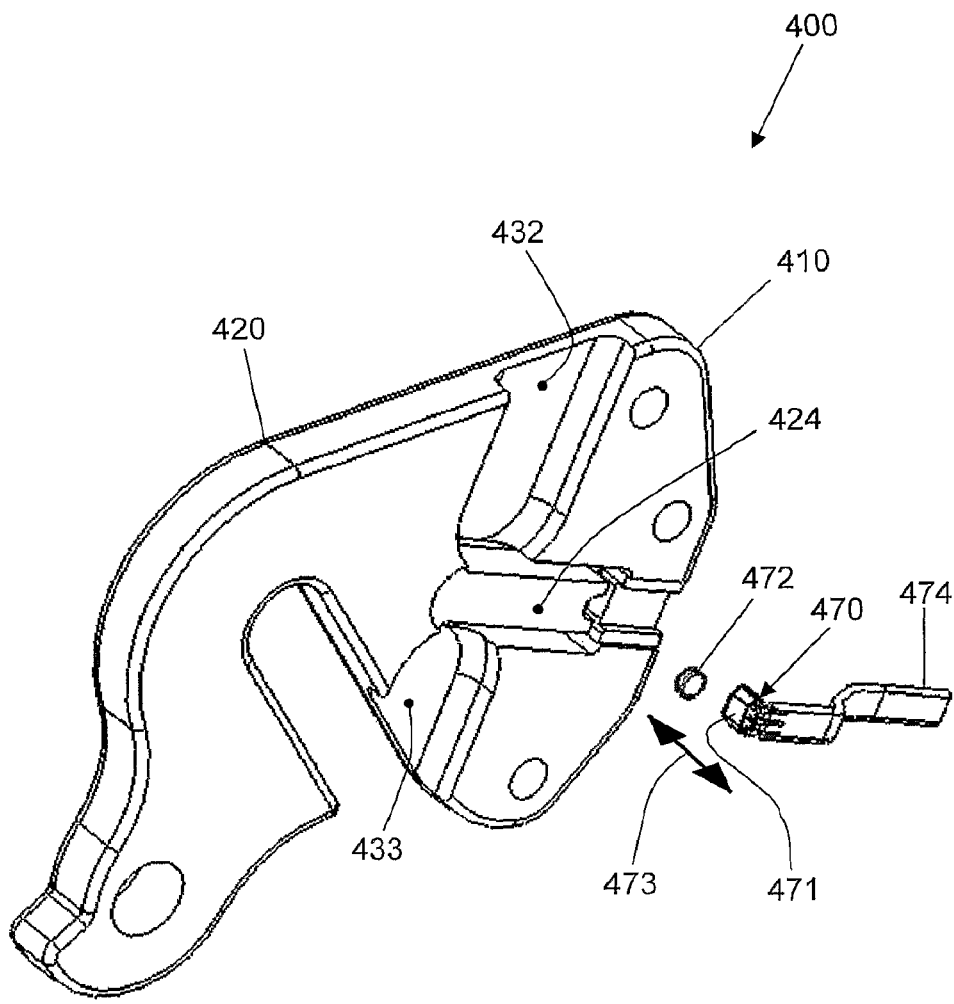
Figure 8B:
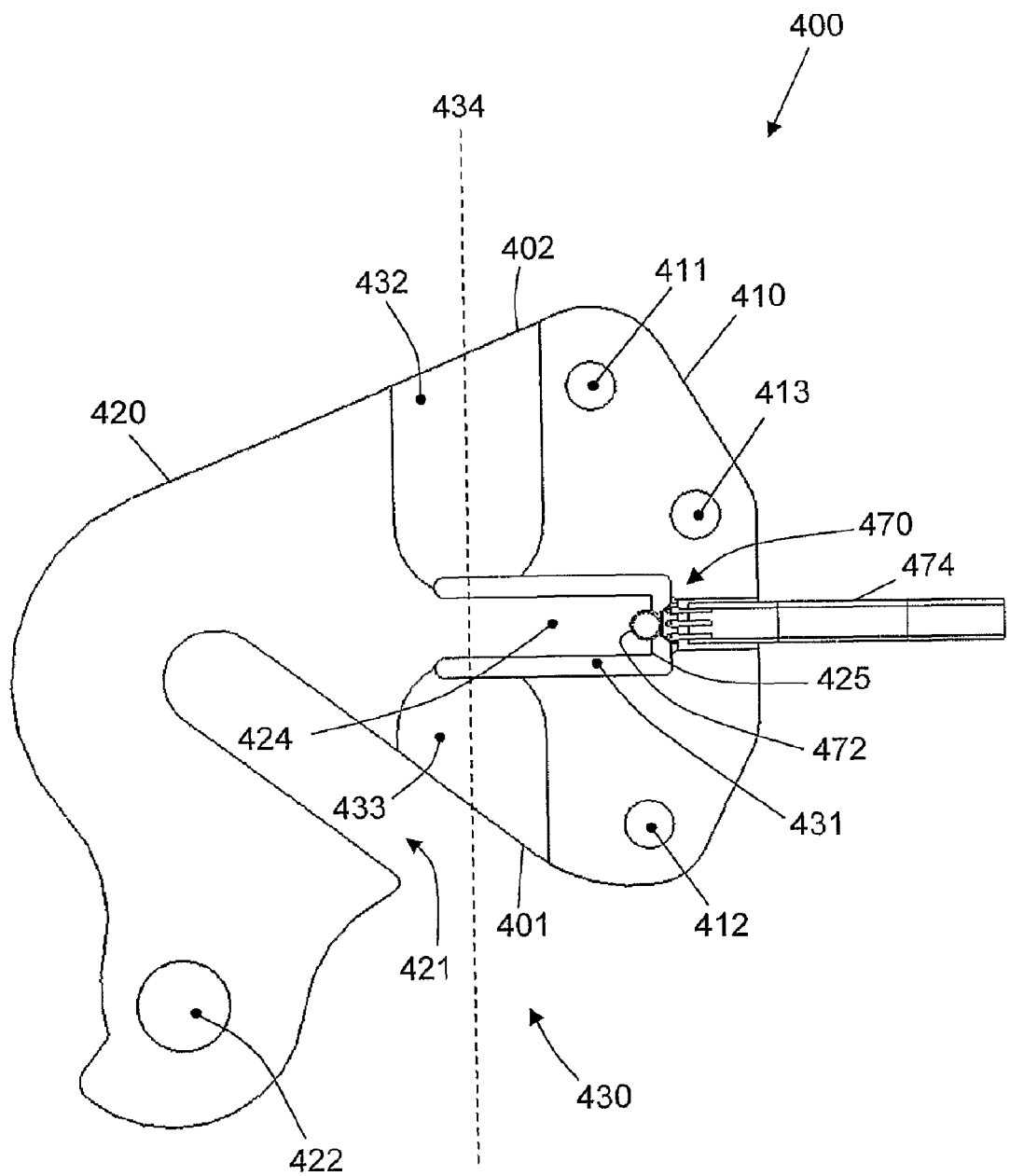
Figure 9:
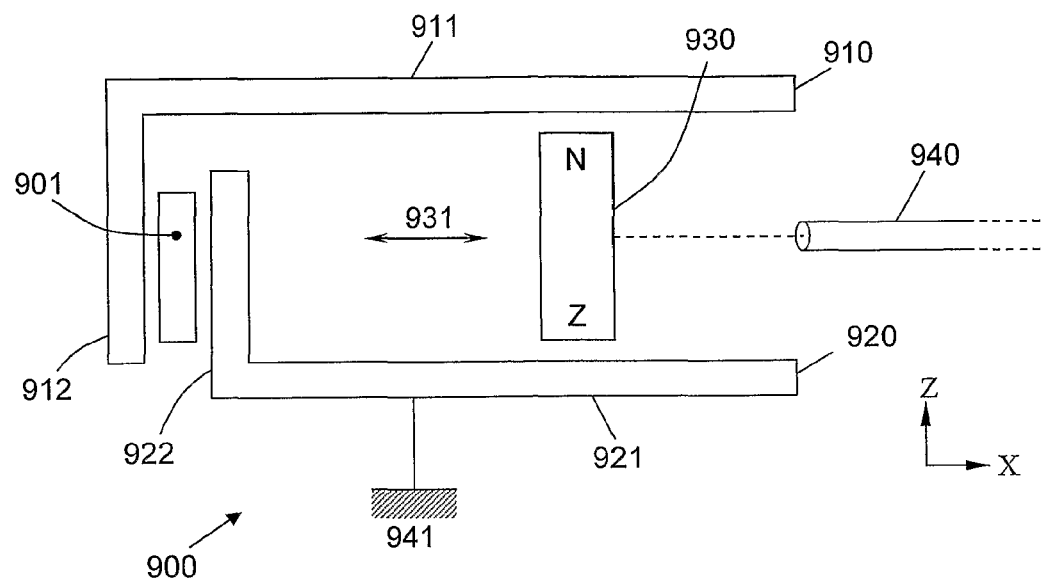
Figure 10A:
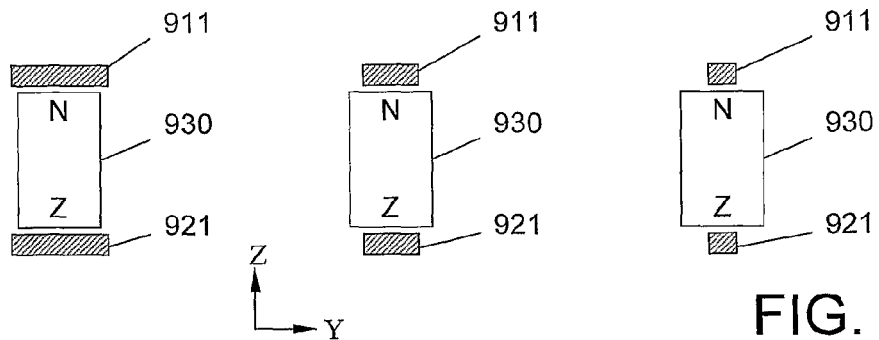
Figure 10B:
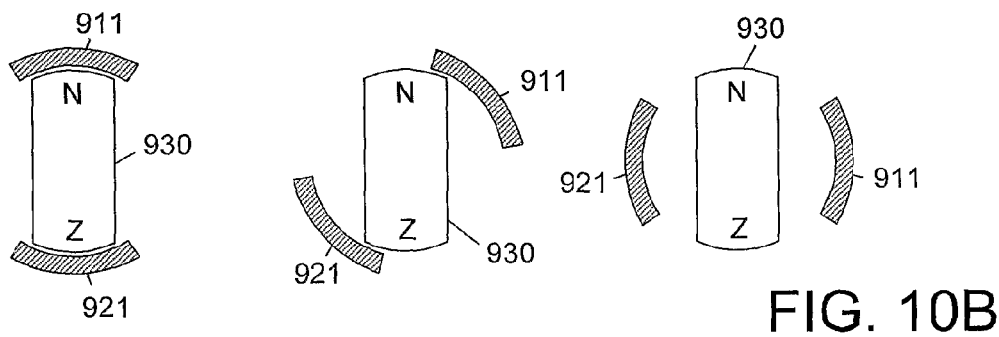
Figure 10C:
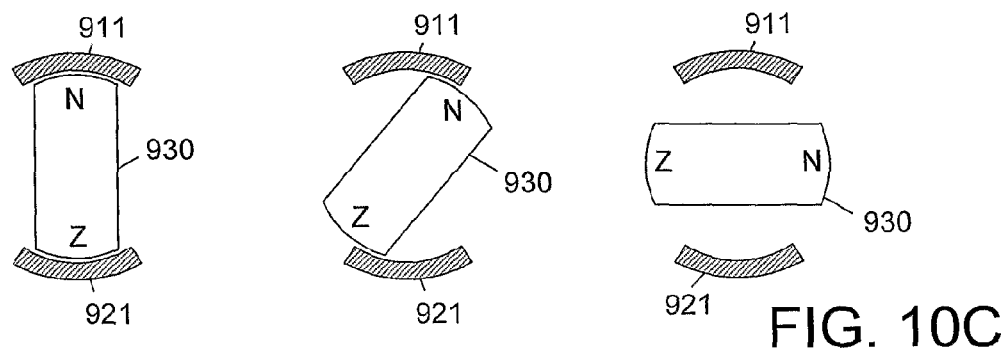
Figure 10D:
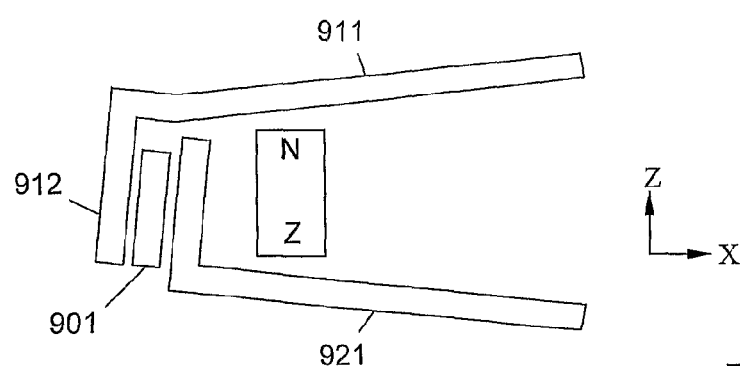
Figure 11:
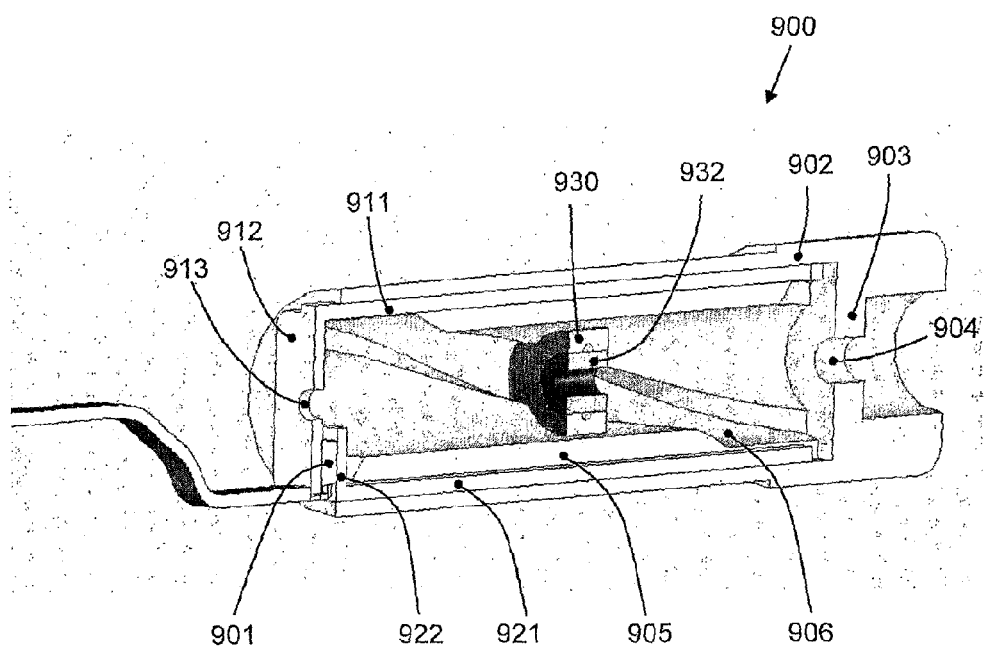

FIG. 7A shows a side view of a dropout according to the present invention;

FIG. 7B is a schematic cross-section according to the line B-B in FIG. 7A;

FIG. 7C shows an exploded perspective view of the dropout of FIG. 7A;

FIGS. 8A and 8B show an exploded perspective view and a side view, respectively, of a dropout according to the present invention;

FIG. 9 schematically illustrates the measuring principle proposed by the present invention;

FIG. 10A schematically shows a YZ-section of a first embodiment of the measuring device illustrated in FIG. 9;

FIG. 10B schematically shows a YZ-section of a second embodiment of the measuring device illustrated in FIG. 9;

FIG. 10C schematically shows a YZ-section of a third embodiment of the measuring device illustrated in FIG. 9;

FIG. 10D schematically shows an XZ-section of a fourth embodiment of the measuring device illustrated in FIG. 9;

FIG. 11 schematically shows a perspective view of the measuring device according to FIG. 10C sectioned in the longitudinal direction.

Figure 1:
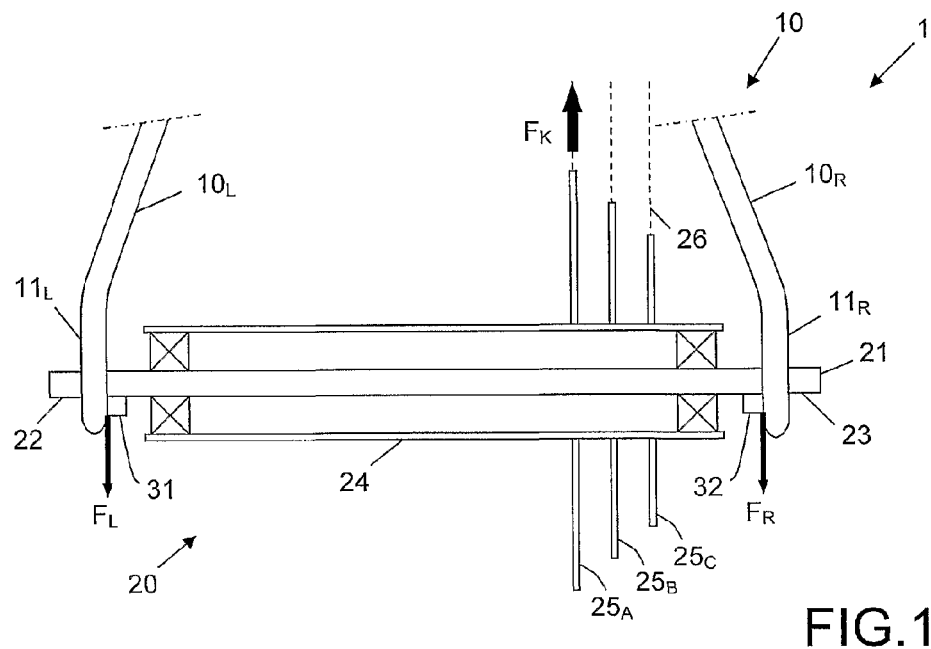

FIG. 1 schematically shows a top view, partially in section, of a part of a bicycle 1, and in particular a part at the driven rear axle of the bicycle 1. The bicycle 1 has a frame 10, of which two frame tubes 10L and 10R are shown in FIG. 1. At its rear end, each frame tube 10L, 11R is provided with a respective coupling piece 11L, 11R for attachment of the rear axle. Such a coupling piece is also known as "rear dropout", and will hereinafter be briefly indicated as "dropout".

The bicycle 1 further has a rear wheel 20 with a fixed rear axle 21, of which the ends 22 and 23 are fixedly connected to the dropout 11L and the dropout 11R, respectively. The rear wheel 20 further has a wheel hub 24 that is mounted rotatably about the fixed rear axle 21. The wheel hub 24 carries spokes, which are not shown in FIG. 1 for the sake of simplicity. On the wheel hub 24, several chain wheels 25 are mounted next to each other, three of which are shown in FIG. 1, mutually distinguished by addition of the letters A, B, C. A chain 26 indicated in FIG. 1 by means of dotted lines can selectively be coupled to one of the chain wheels 25A, 25B, 25C.

If a user exerts a force on pedals (not shown for the sake of simplicity), the chain 26 exerts a (usually substantially horizontally directed) chain force FK on the chain wheel 25 concerned. As a result, the ends 22, 23 of the rear axle 21 and the corresponding dropouts 11L, 11R mutually exert reaction forces FL and FR onto each other; in FIG. 1, the arrows indicate the forces being exerted on the axle ends by the dropouts. It is simple to recognize that applies:

$$|FK| = |FL| + |FR| \qquad (1)$$

The ratio FL/FR depends on the chosen chain wheel. As long as this choice does not change, the reaction force at one of the axle ends, thus FL or FR, can be regarded as being representative for the chain force FK, because proportional to this chain force. When the user chooses another transmission ratio, for example by coupling the chain to the second chain wheel 25B instead of the first chain wheel 25A, the point of action of the chain force FK displaces towards the second axle end 23, and (with constant chain force FK), the corresponding reaction force FR will increase, at the cost of a decrease of the reaction force FL at the opposite axle end 22. Thus, the individual reaction forces FL and FR are then not a reliable measure for the chain force FK. However, formula (1) still applies: i.e. the sum of the two reaction forces FL and FR remains a reliable measure for the chain force FK.

A bicycle 1 according to the present invention based on this insight is provided with two force sensors 31 and 32, each adapted for measuring one of those two reaction forces FL and FR. Since use can be made here of force sensors known per se, a further discussion thereof may be omitted here. Embodiments of sensors proposed by the present invention will be discussed later.

Figure 2A:
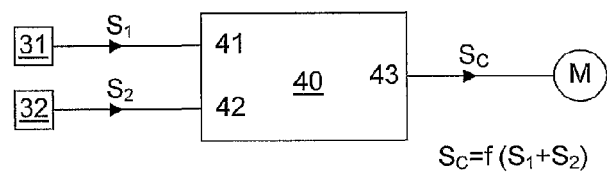
Figure 2B:
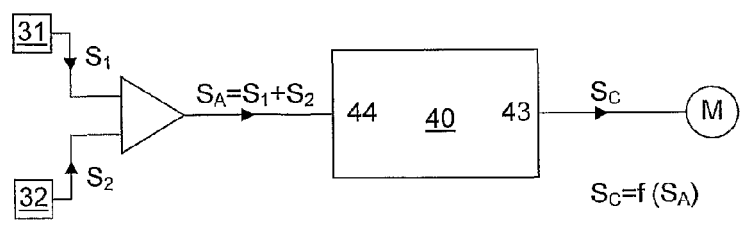

The bicycle 1 is further provided with an electrical auxiliary motor M controlled by a controller 40, as sketched in the FIGS. 2A and 2B. In FIG. 2A, it is shown that the controller 40 may have two measuring inputs 41, 42, to which the respective force sensors 31, 32 are connected, as well as a control output 43 to which the motor M is connected. The controller 40 is adapted to receive the two measuring signals S1 and S2 generated by the respective force sensors 31, 32, to add them for obtaining an added measuring signal SA, and to generate a motor control signal SC at the control output 43 based on the added measuring signal SA.

In FIG. 2B, it is shown that it is possible to externally add the two measuring signals S1 and S2 generated by the respective force sensors 31, 32 to an added measuring signal SA, and to supply this added measuring signal SA to a single measuring input 44 of the controller 40. In that case, the controller 40 is adapted to receive the added measuring signal SA, and to generate a motor control signal SC at the control exit 43 based on the single input signal SA.

In a particularly suitable embodiment, each of the said force sensors 31, 32 is implemented as a half bridge of Wheatstone, and the force sensors are coupled with each other for forming a full bridge of Wheatstone, of which the output signal is the sum signal of both half bridges.

For measuring the said reaction forces, the present invention makes use of the fact that a reaction force will cause a deformation in the dropout concerned, which deformation is measurable. This applies in fact, to a lesser or larger extent, to each dropout regardless of its construction. At an arbitrary dropout, the dropout will also deform as a result of the weight of the rider, and that will influence the measuring results disadvantageously. The present invention now proposes to design a dropout in such a way that the dropout is mainly sensitive to horizontal forces and is almost insensitive to weight changes (vertical forces). The present invention further proposes to design a dropout in such a way that the deformation thereof takes place in a well defined manner, is to a good extent proportional with the reaction force concerned, and is easily measurable.

In general, the chain force will have the result that the rear axle is displaced forwardly relative to the frame, and that the rear axle and/or the frame bends relative to a vertical bending axis. Consequently, in the first case, the deformation of the dropout will be such that a dropout part coupled with the rear axle is displaced horizontally in the direction of a dropout part coupled with the frame, and, in the second case, the deformation of the dropout will be such that a dropout part coupled with the rear axle is bend or pivoted about a vertical bending axis relative to a dropout part coupled with the frame. In general, the occurring deformation of the dropout will be a combination of these two effects.

Two design variations will be discussed hereinafter. In the one design variation, a fairly large horizontal displacement of the dropout part coupled with the rear axle occurs, so that the chain force can be measured reliably by measuring the occurring deformation as a result of the horizontal displacement only. In the second design variation, a fairly large bending about the vertical axis occurs, so that the chain force can be measured reliably by measuring the occurring deformation as a result of the bending only.

In both cases, it is possible to generate a signal by means of a sensor that is sensitive to deformation of a dropout part (bending, shearing, etc); in both cases, however, it is also possible to generate a signal by means of a sensor that is sensitive to displacement of two dropout parts relative to each other.

FIG. 3A is a schematic perspective view of a dropout 50 proposed by the present invention. A dropout is a part of the bicycle frame 10 to which the end of an axle is fixed. Usually, a dropout is formed from a plate-shaped piece of metal, for example aluminium or steel, with a thickness of several millimetres. A dropout has an axle receiving part with a receiving space for an axle, usually in the form of a slot, and a dropout has one or more coupling parts which is/are fixedly coupled with one or more frame tubes. This fixed coupling can be accomplished by means of screws or welding or glueing or the like, but it is also possible that a coupling part is manufactured as an integral whole with the frame.

According to the state of the art, a dropout is implemented as a rigid whole, so that there is a rigid coupling between the axle receiving part on the one hand and the coupling part(s) on the other hand. A dropout according to the present invention distinguishes itself from this in that an elastically deformable transition part is situated between the axle receiving part on the one hand and the coupling part(s) on the other hand, which transition part allows a small displacement of the axle receiving part relative to the coupling part(s) in a well-defined direction. In the embodiment of the FIGS. 3A-3B, this concerns a displacement in horizontal direction, in the longitudinal direction of the bicycle, while the dropout is rigid for deformations in other directions.

FIG. 3B shows a schematic side-view of a possible embodiment of the dropout 50. An axle receiving part is indicated with 51, and has an axle receiving space 52 indicated as a circular hole. The axle receiving space 52 may be implemented as a slot, as is known per se and is not shown for the sake of simplicity.

The dropout 50 further has a coupling part 53 intended to be attached to one or more frame tubes; an end part of a horizontal frame tube is schematically indicated at 10 in FIG. 3B.

From a lower edge 54, a substantially vertically directed groove 55 is arranged, up to approximately half the height of the dropout 50. Next to the groove 55, and above the axle receiving space 52, a recess 56 is arranged. In principle, the precise shape of this recess 56 is not critical, but preferably it has two substantially vertical side edges 57, 58 which are approximately equally long. The groove 55 and the recess 56 may for example be made by means of laser cutting.

Due to the design of the recesses 55 and 56, the axle receiving part 51 is connected to the fixed coupling part 53 by means of two substantially vertical carrying legs 61 and 62. A first carrying leg 61 is defined between the groove 55 and a first side edge 57 of the recess 56. A second carrying leg 62 is defined between the second side edge 58 of the recess 56 and the rear edge 59 of the dropout 50 which is also preferably substantially vertically directed. Although not essential, it is preferred that the legs 61, 62 are equally long and equally wide. The two vertical carrying legs 61, 62 offer a strong attachment of the axle receiving part 51 to the fixed coupling part 53. In case of a vertical load, they will not or hardly undergo a length change. In case of a horizontal load of the axle receiving part 51, these carrying legs 61, 62 can however bend a little, so that they allow for a small horizontal displacement of the axle receiving part 51 relative to the fixed coupling part 53. Within a certain work range, which depends on the dimensioning of the dropout 50 and the carrying legs 61, 62, this horizontal displacement is proportional to the horizontal force component exerted on the axle receiving part 51, which thus, with reference to the preceding, concerns the component FR or FL.

The said displacement is well and easily measurable with displacement sensors known per se. It is conceivable to make use of capacitive sensors, or sensors functioning on the basis of a photo cell, or by means of laser interferometry, or the like. A suitable sensor, that has proven itself in practice, is a strain gauge, and therefore, according to the present invention, use is preferably made of a measuring cell of which the functioning is based on a strain gauge.

FIG. 4 shows a schematic view of such a measuring cell 70. The measuring cell 70 comprises a thin plate-shaped carrier 71, with a contour in the form of an I, which may be made by punching out of plate material, for example aluminium or steel, with a thickness in the order of approximately 0.2-0.3 mm, so that the stiffness thereof is much lower than that of the dropout 50. The carrier 71 has a central body 72 (the central flange of the I) and two connecting ends 73, 74. The central body 72 has a length corresponding to that of the length of the carrying legs 61, 62, and may have a width of approximately 10 mm.

The measuring cell 70 is attached to the dropout 50 in such a way that the central body 72 is directed substantially vertically and bridges the recess 56, wherein the one connecting end 73 is fixed to the fixed coupling part 53 of the dropout 50, and wherein the other connecting end 74 is fixed to the axle receiving part 51 of the dropout 50, as illustrated in FIG. 3A and indicated with dotted lines in FIG. 3B. When a chain force is exerted, the second connecting end 74 is then displaced relative to the first connecting end 73 in a direction perpendicular to the longitudinal direction of the central body 72, which thereby is loaded for shearing. One or more strain gauges 75 are arranged on this central body 72 (only schematically indicated in FIG. 4) in such a way that they are sensitive to shearing, as will be clear to a person skilled in the art.

Connecting the measuring cell 70 to the dropout 50 can be done by means of screwing or the like, and does not need further explanation. The electronics (controller 40) belonging to the measuring cell can advantageously be accommodated in the recess 56, which leads to a compact and robust entirety.

Instead of a connection for measuring shear, the measuring cell 70 could also be connected for measuring a bending or for measuring an elongation, for example by mounting the central body 72 horizontally, bridging the groove 55.

In the embodiment discussed above, the dropout is an integral part of the frame or is fixedly attached thereto, and the dropout itself has a deformable zone to which a deformation sensor such as a strain gauge is attached. However, it is also possible to provide a separate measuring block comprising a deformable zone and a separate dropout, wherein the measuring block is attached to the frame, and wherein the dropout is attached to the measuring block, as will be explained hereinafter.

A great advantage of this embodiment is the universal applicability thereof.

FIG. 5A is a schematic perspective view of a particularly simple embodiment of such a measuring block 100. The measuring block 100 generally has the form of a rectangular block, with a central hole 101 in it. Because of this, the measuring block 100 has a top connecting part 102 and a bottom connecting part 103, which parts 102 and 103 are relatively rigid parts, and two substantially vertically directed connecting bridges 104, 105 which connect the top connecting part 102 and the bottom connecting part 103 together. The purpose of the measuring block 100 is that the top connecting part 102 is fixed to the frame of a bicycle, and that a dropout (not shown) is fixed to the bottom connecting part 103.

The connecting bridges 104, 105 can bend a little, so that they allow a horizontal displacement of the bottom connecting part 103 relative to the top connecting part 102, as indicated with the arrow 22 in FIG. 5A. For measuring this displacement, the measuring block 100 may be provided with a measuring cell 70 as discussed in the preceding; in that case, the top connecting part 73 of the measuring cell 70 is attached to the top connecting part 102 of the measuring block 100, the bottom connecting part 74 of the measuring cell 70 is attached to the bottom connecting part 103 of the measuring block 100, and the central body 72 of the measuring cell 70 bridges the central hole 101 of the measuring block 100.

It is also possible to measure the bending of one or both connecting bridges 104, 105, for example by attaching a strain gauge 106 to a side face 107 of a connecting bridge 104, as sketched in FIG. 5A. An advantage of the use of the separate measuring cell 70 is that, in the case of an unexpected defect, it can be exchanged relatively easily.

In the dimensioning of the dropout 50 discussed above and the measuring block 100, respectively, one can assume a deformation (displacement) of approximately 0.2 mm at a maximum chain force of approximately 2500 N. A displacement in the range of 0 to 0.2 mm is very well measurable by means of strain gauges. In practice, however, an overload could occur, wherein the deformation becomes so large that a strain gauge deforms plastically, or worse. In order to prevent that, preferably a stop is provided which functions as stroke limiter, so that, also in the case of excessively large chain forces (or external forces), the deformation of the dropout 50 and the measuring block 100, respectively, does not exceed a predetermined value of for example approximately 0.2 mm.

In the embodiment of the dropout 50 of FIGS. 3A and 3B, the edges of the groove 55 function as such a stop. In exerting a pedal force, the axle receiving part 51 moves horizontally forward (to the left in FIG. 3B, as indicated by the arrow P1), wherein the groove 55 is squeezed. FIG. 3C shows the free end of the groove 55 on a larger scale; there, the side edges of the groove 55 are indicated by the reference numerals 65 and 66. When these side edges 65, 66 touch each other (right half of FIG. 3C), a further displacement of the axle receiving part 51 relative to the coupling part 53 is not possible, so that a further deformation of the measuring cell 70 is avoided.

It is noted that such a stroke limiter as protection against overload may be omitted in the case that use is made of an optical or magnetic displacement sensor.

A reliable stroke limiter requires that the width of the groove 55, at least at its free end, can be made with a fairly large degree of accuracy. For the remaining, the dropout 50 can be manufactured relatively cheaply, for example by means of laser cutting, with a tolerance of approximately 0.15 mm. Then, it is desired that this tolerance can also be used in manufacturing the groove 55. FIG. 3D illustrates a detail which enables such.

According to FIG. 3D, at the free bottom end of the groove 55, preferably on the fixed coupling part 53, an adjustable stop 63 is provided. As shown, the groove 55 may have a relatively large width over its entire length, for example approximately 0.5 mm. Only at the free bottom end, i.e. the transition to the bottom edge 54, the side edge 65 is provided with a protrusion 63 protruding from the side edge 65 towards the opposite edge 66, wherein thus the distance between this protrusion 63 and the opposite side edge 66 is smaller than the groove width of the groove 55. The space between the protrusion 63 and the opposite side edge 66 will be indicated as gap 64.

Directly after the laser cutting process, the width of this gap 64 is still larger than the desired gap width, which defines the displacement freedom of the axle receiving part 51 relative to the coupling part 53.

According to the invention, a relatively simple, mechanical finishing takes place, wherein a stroke is given on the protrusion 63 with a hammer or the like, for example in a direction perpendicular to the plane of drawing of FIG. 3D. As a result thereof, the material of the protrusion 63 will displace in lateral direction, also in the direction of the opposite side edge 66, so that the width of the gap 64 becomes smaller. Because of this, it is possible to accurately adjust the width of this gap 64 to a desired gap width. This can advantageously be obtained in a single stroke process if a calibrated filling plate is inserted in this gap 64 before the said hammer stroke or the like is performed: this filling plate, which is preferably made of hardened steel, then forms a limitation for the flowing material of the protrusion 63.

In order to facilitate deformation of the protrusion 63, the protrusion 63 may be provided with a hole 67, as illustrated, which may also be made by the laser cutting process.

FIG. 5B is a schematic side view of a variation of the measuring block 100, wherein also an adjustable stop is provided which functions as stroke limiter. In this embodiment, the top end bottom connecting parts 102 and 103 encounter each other at short distance. In this context, a recess 112 with vertical edges 114, 115 is arranged in the bottom side of the top connecting part 102, and the top side of the bottom connecting part 103 is provided with a protruding lip 113 with vertical edges 116, 117. The lip 113 fits in the recess 112 with little play. In relaxed situation (no chain force is present), the lip 113 does not touch the edges of the recess. In case of a horizontal displacement of the bottom connecting part 103 (for example to the right), this bottom connecting part 103 can displace freely until the right side edge 117 of the lip 113 comes into contact with the right side edge 115 of the recess 112. The horizontal displacement freedom in the opposite direction is limited to the width of the gap 118 between the left side edge 116 of the lip 113 and the left side edge 114 of the recess 112.

Also in this case, the freedom of movement can be set by setting the horizontal width of the gaps 118, 119, in fact by giving a hammer stroke on the lip 113 and/or on the material parts of the top connecting part 102 on both sides of the recess 112.

In the embodiments discussed in the preceding, the reaction force (see FR and FL in FIG. 1) between frame and axle is always measured. The combination of the chain force FK and the reaction forces FL, FR also lead to a moment (in relation to a vertical axis) being present in the axle 21, and this bending moment is passed on to the respective dropouts 11L, 11R. Also this bending moment is a good measure for the chain force FK, and can advantageously be measured. FIG. 6 is a schematic perspective view of a dropout 200, which is adapted to be able to measure the occurring bending moment in the dropout 200.

The dropout 200 comprises a frame connecting part 210 intended for connecting to the frame of a bicycle. Here, the frame connecting part 210 has the shape of a rigid vertical strip with two mounting holes 211, 212.

The dropout 200 further comprises an axle receiving part 220, with an insert slot 221 for connecting an axle, and a hole 222 for connecting the derailleur.

Between the frame connecting part 210 and the axle receiving part 220, the dropout 200 has an elastically deformable transition part 230, which connects the axle receiving part 220 to the frame connecting part 210.

Advantageously, the dropout 200 is manufactured as a whole from a plate-shaped piece of metal, for example aluminium or steel, with a thickness of several millimetres. The transition part 230 is then a part with smaller thickness than the frame connecting part 210 and the axle receiving part 220, and is hence less rigid for bending. In the embodiment shown, a recess 231 is situated between the frame connecting part 210 and the axle receiving part 220. The frame connecting part 210 is connected to the axle receiving part 220 by a first connecting arm 232 and a second connecting arm 233, of which the thickness is less than that of the frame connecting part 210 and the axle receiving part 220, and which are located vertically above each other and together form the transition part 230. When a bending moment is exerted on the dropout 200, a bending will mainly occur in the transition part 230 because of this. Due to the chosen configuration, the transition part 230 is particularly sensitive to bending about a vertical axis 234.

The dropout 200 further has a horizontal material bridge 241 bridging the recess 231, of which the one end is connected to the frame connecting part 210 and of which the other end is connected to the axle receiving part 220. The material bridge 241 is preferably thicker than the connecting arms 232, 233, and more preferably has the same thickness as the frame connecting part 210 and the axle receiving part 220. A bending sensor 242 is arranged on the surface of the material bridge 241; a bending sensor is preferably also arranged on the opposite surface of the material bridge 241, but that is not shown for the sake of simplicity. The bending sensor 242 is advantageously implemented as strain gauge, or as system of multiple strain gauges, as will be clear to a person skilled in the art. When the dropout 200 bends, this leads to a bending in the material bridge 241; the bending thereof is measured with the bending sensor 242.

In the preceding, with reference to FIG. 3A, a design variation is discussed, wherein the dropout substantially undergoes a deformation corresponding to a horizontal displacement of the rear axle in the direction toward the frame (forward), while, with reference to FIG. 6, a design variation is discussed wherein the dropout substantially undergoes a deformation corresponding to a bending about a vertical axis. In both cases, the deformation occurring in a body part of the dropout (shearing, bending) was measured, wherein use was made of strain gauges. Strain gauges are commonly known sensors, which supply reliable measuring results and are very sensitive to small deformations, so that strain gauges may indeed be used successfully for the described purpose. However, a drawback of strain gauges is that they must be glued accurately to the part to be measured, and that a special amplifier is needed for amplifying the signals supplied by the gauges. The present invention provides an alternative lacking these drawbacks. To that end, the present invention proposes to design a dropout in such a way that the occurring deformation results in a linear displacement of two points of the dropout situated near each other, and to measure this linear displacement by means of a displacement sensor.

As displacement sensor, use can for example be made of a capacitive sensor, or an optical sensor. In a preferred embodiment, however, use is made of a Hall-sensor. This type of sensor is available well, has a good sensitivity in the displacement range concerned (0-0.2 mm), and the output signal is directly usable for further processing. Alternatively, another type of magnetic field sensor may be used.

FIG. 7A shows a side view of a dropout 300 according to the present invention, of which the design has similarities with the design of the dropout 50 of FIG. 3A. The dropout 300 has a frame connecting part 310 provided with mounting holes 311, 312, 313. The dropout 300 further comprises an axle receiving part 320, with an insert slot 321 for connecting an axle, and a hole 322 for connecting a derailleur. Between the frame connecting part 310 and the axle receiving part 320, the dropout 300 has an elastically deformable transition part 330.

The dropout 300 is advantageously manufactured as a whole from a plate-shaped piece of metal, for example aluminium or steel, having a thickness of several millimetres, typically in the order of 4-7 mm. The dropout 300 has a first groove-shaped cut 351 extending almost vertically from a lower edge 301 up to a measuring part 323 of the axle receiving part 320, and a second groove-shaped cut 352 extending substantially in line with the first groove-shaped cut 351 from the measuring part 323 up to the deformable transition part 330.

The dropout 300 further has a third groove-shaped cut 353 extending substantially parallel to the first and second cuts 351 and 352, bridging the measuring part 323. This third groove-shaped cut 352 together with the first groove-shaped cut 351 defines a first transverse arm 361 which couples the measuring part 323 with the frame connecting part 310, and, together with the second groove-shaped cut 352, defines a second transverse arm 362 which couples the measuring part 323 with the frame connecting part 310, wherein these two transverse arms 361 and 362 are situated substantially in line. In mounted situation, these two transverse arms 361 and 362 will be directed substantially perpendicular to the chain force.

Under influence of a chain force, the transition part 330 will deform elastically, and the measuring part 323 will displace in the direction of the frame connecting part 310. In that case, the two transverse arms 361 and 362 will bend a little, but will prevent the measuring part 323 from undergoing another displacement than a substantially linear one.

This linear displacement can then be accurately measured by means of a Hall sensor that is fixedly connected to the frame connecting part 310, wherein a magnet element is fixedly connected to the measuring part 323. In this context, it is possible that the arrangement is such that the magnet element moves towards the sensor surface of the Hall sensor, so that the mutual distance between the magnet element and the Hall sensor is influenced by the displacement of the measuring part 323 caused by the chain force. However, a disadvantage is then that in the case of large chain forces, the magnet element could touch the Hall sensor, and in order to prevent this, the mutual distance between the magnet element and the Hall sensor must be fairly large in the rest situation, which influences the sensitivity of the Hall sensor disadvantageously. Further, it is a disadvantage in such an arrangement that the relation between displacement and sensor output signal is non-linear. Therefore, the arrangement is preferably such that the magnet element moves over the sensor surface of the Hall sensor, substantially parallel to this sensor surface. FIG. 7B is a schematic cross-section according to the line B-B in FIG. 7A, illustrating this arrangement.

A lip 324 is formed on this measuring part 323, of which the thickness is reduced relative to the general thickness of the dropout 300, and which partially bridges the third cut 353. A carrier 374 is connected to the frame connecting part 310, which carrier also partially bridges the third cut 353, and carries a Hall sensor 370 at its end. The Hall sensor 370 has a measuring surface 371 directed towards the lip 324 (with this, it is meant that the normal of this measuring surface, which coincides with the sensitivity direction of the sensor, is directed toward the lip 324). To the lip 324, on its side directed toward the Hall sensor 370, a magnet element 372 is attached, at small distance from the measuring surface 371 of the Hall sensor 370. The wiring of the Hall sensor 370 is mounted to or in the carrier 374, but that is not shown in the figure for the sake of simplicity.

Alternatively, the Hall sensor could be attached to the movable lip, and the magnet element could be attached to the fixed frame connecting part.

In exerting a chain force, the measuring part 323 moves toward the frame connecting part 310, wherein the lip 324 with the magnet element 372 displaces over the measuring surface 371 of the Hall sensor 370, parallel to this measuring surfacer as indicated by the arrow 373. This results in a measuring signal being representative for the magnitude of the displacement, as will be clear to a person skilled in the art.

FIG. 7C shows an exploded perspective view of the dropout 300 with the Hall sensor 370 and the magnet element 372.

It should be clear that a Hall sensor can be implemented in a similar way at the dropout as discussed with reference to FIG. 3A, or the measuring block 100 as discussed with reference to FIG. 5B.

The FIGS. 8A and 8B show an exploded perspective view and a side view, respectively, of a dropout 400 according to the present invention, of which the design has similarities with the design of the dropout 200 of FIG. 6. The dropout 400 has a frame connecting part 410 provided with mounting holes 411, 412, 413. The dropout 400 further comprises an axle receiving part 420 having an insert slot 421 for connecting an axle, and a hole 422 for connecting a derailleur. Between the frame connecting part 410 and the axle receiving part 420, the dropout 400 has an elastically deformable transition part 430 connecting the axle receiving part 420 to the frame connecting part 410.

The dropout 400 is advantageously manufactured as a whole from a plate-shaped piece of metal, for example aluminium or steel, having a thickness of several millimetres. The transition part 430 is then a part with smaller thickness than the frame connecting part 410 and the axle receiving part 420, and is hence less rigid to bending. In the embodiment shown, a recess 431 is situated between the frame connecting part 410 and the axle receiving part 420. From a top edge 402, a first recessed part 432 with reduced thickness extends to the recess 431. From a lower edge 401, a second recessed part 433 with reduces thickness extends to the recess 431. The two recessed parts 432 and 433 are situated vertically above each other, and together form the transition part 430. When a bending moment is exerted on the dropout 400, a bending will mainly occur in the transition part 430 because of this. Due to the chosen configuration, the transition part 430 is mainly sensitive to bending about a vertical axis 434.

The dropout 400 further has a lip 424 which partially bridges the recess 431 and which has one end fixed to the axle receiving part 420. The vertical axis 434 is situated in the vicinity of this end of the lip 424. In the embodiment shown, the lip 424 forms a whole with the axle receiving part 420 because the recess 431 is formed as a U-shaped groove with horizontal legs, of which the bottom is directed toward the frame connecting part 410 and of which the ends of the legs are directed toward the axle receiving part 420.

Under influence of a chain force, the transition part 430 will elastically bend in horizontal direction, i.e. about the vertical bending axis 434. In this case, the body plane of the axle receiving part 420 will remain substantially flat, and also the body plane of the frame connecting part 410 will remain substantially flat, but these two body planes will now make an angle with each other which is unequal to 180°. More particularly, this angle can be written as 180°-α, wherein α, to a good approximation, is proportional to the chain force. Since the lip 424 is fixedly connected to the axle receiving part 420, the orientation of the lip 424 relative to the axle receiving part 420 remains preserved. As a result, the free end 425 of the lip 424 will undergo a displacement relative to the frame connecting part 410 in a plane perpendicular to the bending axis 434. To a good approximation, for small bending angles α, this displacement can be described as a linear displacement, perpendicular to the plane of drawing of FIG. 8B, over a distance which is proportional to the bending angle α and thus to the chain force.

This linear displacement can be measured accurately by means of a Hall sensor which is fixedly connected to the frame connecting part 410, wherein a magnet element is fixedly connected to the axle receiving part 420. It is again preferred that the magnet element moves over the sensor surface of the Hall sensor, substantially parallel to this sensor surface. FIG. 8B shows that a carrier 474 is attached to the frame connecting part 410, carrying a Hall sensor 470 at its end. The Hall sensor 470 has a measuring surface 471 (see FIG. 8A) directed towards the free end 425 of the lip 424. A magnet element 472 is attached to the free end 425 of the lip 424, at short distance from the measuring surface 471 of the Hall sensor 370. The wiring of the Hall sensor 470 is mounted to or in the carrier 474, but that is not shown in the figure for the sake of simplicity.

Alternatively, the Hall sensor could be attached to the movable lip, and the magnet element could be attached to the fixed frame connecting part.

In exerting a chain force, the free end 425 of the lip 424 with the magnet element 472 moves over the measuring surface 471 of the Hall sensor 370, parallel to this measuring surface, as indicated by the arrow 473. This results in a measuring signal that is representative for the magnitude of the displacement, as will be clear to a person skilled in the art.

The present invention further provides a device for providing a signal which is indicative for the selected gear of a bicycle. The device in fact measures the position of a control cable, and the proposed measuring device is also usable for other applications where it is desired to measure the position of a control cable.

In controlling the gears of a bicycle, the control cable travels a distance between the extreme positions in the order of approximately 2 cm. The invention proposes to measure the position of the cable by means of a Hall sensor, because of the good availability against relatively low costs thereof, and because of the fact that the output signal of a Hall sensor is directly applicable for further processing. Alternatively, another type of magnetic field sensor may be used.

As known, a Hall sensor gives a measuring signal that is a measure for the displacement of a magnet element relative to the sensor. Hall sensors are outstandingly suitable for detecting the passing of a magnet, and for measuring displacements at small distance, but it is not easy to generate a reliable measuring signal that covers a displacement range of 2 cm. The present invention aims at solving this problem.

According to a first aspect of the present invention, the measuring device comprises a housing with a Hall sensor mounted fixedly relative to this housing, a magnet element being displaceable relative to this housing, and means to couple the magnet element with a control cable. The purpose is that the magnet element is coupled with the control cable of the gears, and that the housing is held, for example by attaching to the frame. In the case that the control cable is guided in a cable sheath (Bowden cable), wherein this cable sheath is axially fixed relative to the frame, this cable sheath may be interrupted and the housing of the measuring device may be fixed to the ends of the cable sheath at the position of the interruption. Adjusting the gears by displacing the control cable then causes a displacement of the magnet element relative to the Hall sensor.

According to a second aspect of the present invention, the measuring device comprises magnetic coupling members between the magnet element and the Hall sensor, which coupling members guide the magnetic field of the magnet element to the Hall sensor. These coupling members may for example comprise one or more strips of a material being well conducting to magnetic fields, such as particular metals or ceramic materials, or other suitable materials with a sufficiently high magnetic permeability, as will be clear to a person skilled in the art.

According to a third aspect of the present invention, the coupling between the magnetic coupling members on the one hand and the magnet element on the other hand, or between the magnetic coupling members on the one hand and the Hall sensor on the other hand, or both, depends on the position of the cable.

FIG. 9 schematically illustrates the measuring principle proposed by the present invention. A measuring device 900 comprises two metal strips 910 and 920. Each strip 910, 920 is bent to an L-shaped contour with a leg 911, 921 and a foot 912, 922. The strips are arranged next to each other, wherein the feet 912, 922 are arranged parallel to each other. A Hall sensor 901 is arranged between those feet 912, 922. The sensitivity direction of the Hall sensor 901 is directed perpendicular to the surface of the feet 912, 922, i.e. from left to right in FIG. 9. The strips 910 and 920 and the Hall sensor 901 are fixedly mounted relative to a bicycle frame, schematically indicated at 941.

The measuring device 900 further comprises a magnet element 930 with a north pole N and a south pole Z. The magnet element 930 has its magnet axis (vertical in the figure) directed substantially perpendicular to the longitudinal direction (horizontal in the figure) of the legs 911, 921 of the strips 910, 920. The magnet element 930 is coupled with a cable (schematically indicated at 940) of which the position relative to the frame 941 has to be measured. This cable 940 will be directed parallel to the longitudinal direction of the legs 911, 921 of the strips 910, 920. In adjusting this cable 940 relative to the frame 941, the magnet element 930 will be taken along by this cable 940 and will be displaced along the longitudinal direction of the legs 911, 921 of the strips 910, 920, as indicated by the arrow 931.

It is shown in FIG. 9 that the north pole N is directed towards the first leg 911, and that the south pole Z is directed towards the second leg 921. The magnetic field lines of the magnetic field of the magnet 930 will preferably follow a path through the legs 911, 921 and through the feet 912, 922, and will thus be concentrated in the Hall sensor 901 at the transition of the first strip 910 to the second strip 920. The stray field (field lines that go outside the strips 910, 920, and in particular do not pass the Hall sensor 901) will be small.

The strength of the field measured by the Hall sensor 901, in other words the "number of field lines" in the strips 910, 920, depends on the magnetic coupling between those strips 910, 920 and the magnet element 930. The present invention is based on the insight that this coupling can be made dependent of the position of the magnet element 930.

Hereinafter, different embodiment variations will be described by means of an XYZ-coordinate system, wherein the X-axis (coinciding with the longitudinal direction of the cable 940) is horizontal in the plane of drawing of FIG. 9, wherein the Z-axis is vertical in the plane of drawing of FIG. 9, and wherein the Y-axis is perpendicular to the plane of drawing of FIG. 9.

FIG. 10A schematically shows a YZ-section of a first embodiment of the device 900 at three different X-positions of the magnet element 930. In this first embodiment, the legs 911, 921 have a longitudinal direction directed according to the X-axis and they have a width (Y-dimension) that decreases as function of the X-position. Close to the feet 912, 922 (left hand section), the width of the legs 911, 921 is fairly large, and with increasing X-distance to the feet 912, 922, the width of the legs 911, 921 decreases. If the magnet element 930 is situated close to the feet 912, 922 (a position to the left in FIG. 9), then there is a good magnetic coupling with the wide legs 911, 921; if the magnet element 930 is situated far from the feet 912, 922 (a position to the right in FIG. 9), then there is a smaller magnetic coupling with the narrow legs 911, 921, and the Hall sensor 901 gives a smaller signal.

FIG. 10B schematically shows a YZ-section of a second embodiment of the device 900 at three different X-positions of the magnet element 930. In this second embodiment, the legs 911, 921 have a spiral shape around the X-axis, while their width (tangential dimension) is constant. Close to the feet 912, 922 (left hand section), the legs 911, 921 are aligned with the magnetic axis of the magnet element 930. With increasing X-distance to the feet 912, 924, the line connecting the legs 911, 921 makes an increasing angle with the magnetic axis of the magnet element 930, which results in a smaller magnetic coupling and thus a smaller sensor signal. When this angle is 90° (right hand section), the magnetic coupling is almost zero, and thus the sensor signal is almost zero. In this embodiment, it is possible that the legs have a half pitch over the X-range of the displacement of the magnet element 930, so that the situation to the right in FIG. 10B is attained approximately in the centre of the device 900, while, in the end of the device 900 situated at distance from the Hall sensor 901, the first leg 911 is aligned with the south pole Z while the second leg 921 is aligned with the north pole N: in that case, the sensor signal varies from +maximum to −maximum at a displacement of the magnet element 930 over the adjustment range of the cable.

FIG. 10C schematically shows a YZ-section of a third embodiment of the device 900 at three different X-positions of the magnet element 930. In this third embodiment, the legs 911, 921 again have a linear shape parallel to the X-axis, while their width (Y-dimension) is constant. The device is provided with a spiral-shaped guide which lets the magnet element 930 perform a rotation about the X-axis as function of its X-position. Close to the feet 912, 922 (left hand section), the magnetic axis of the magnet element 930 is aligned with the legs 911, 921. With increasing X-distance to the feet 912, 922, the magnetic axis of the magnet element 930 makes an increasing angle with the (vertical) line connecting the legs 911, 921, which results in a smaller magnetic coupling and thus a smaller sensor signal. When this angle is 90° (right hand section), the magnetic coupling is almost zero, and thus the sensor signal is almost zero. In this embodiment, it is possible that said spiral-shaped guide has a half pitch over the X-range of the displacement of the magnet element 930, so that the situation to the right in FIG. 10C is attained approximately in the centre of the device 900, while in the end of the device 900 situated at distance from the Hall sensor 901, the north pole N is aligned with the second leg 921 while the south pole Z is aligned with the first leg 911: in that case, the sensor signal varies from +maximum to −maximum at a displacement of the magnet element 930 over the adjustment range of the cable.

FIG. 11 schematically shows a perspective view of a device 900 according to FIG. 10C sectioned in the longitudinal direction. A cylindrical housing is indicated by the reference numeral 902. The housing 902 has a head end wall 903 with a hole 904 for passing a cable. Also the first leg 912 has a hole 913 for passing a cable. In the housing 902, a synthetic guide bush 905 is arranged, with a spiral groove 906 for the magnet element 930, which spiral groove has a length of a half pitch in this example. In this example, the magnet element 930 has a hole for passing the cable 940, in which hole a rubber ring 932 is arranged, so that the arranged cable 940 will clamp in the magnet element 930 and will thus be able to take along the magnet element 930 in X-direction.

FIG. 10D schematically shows an XZ-section of a fourth embodiment of the device 900. In this fourth embodiment, the legs 911, 921 again have a linear shape, but now they make an angle with the X-axis, while their width (Y-dimension) is constant. Close to the feet 912, 922 (to the left in the figure), the mutual distance between the legs 911, 921 is relatively small; with increasing X-distance to the feet 912, 922, the mutual distance between the legs 911, 921 increases, which results in a smaller magnetic coupling and thus a smaller sensor signal.

Obviously, an embodiment in which above-mentioned principles of functioning are combined is also possible.

In an alternative embodiment, the magnet element and the sensor are fixed relative to the housing, and the coupling members are attached to the cable. Also in that case, the relative position of the coupling members relative to the magnet element and/or the sensor depends on the position or the cable, and (in a suitable configuration of the coupling members) the magnetic coupling between the magnet element and the sensor, and thus the sensor output signal, depends on the position of the cable.

It will be clear to a person skilled in the art that the invention is not limited to the exemplary embodiments discussed in the preceding, but that several variations and modifications are possible within the protective scope of the invention as defined in the attached claims. For example, the present invention is usable in a bicycle with an automatic gear device.

Further, it is possible that a magnet element 930 is fixed in the X-direction relative to a housing 902 of a measuring device 900, and that a cable to be coupled with this magnet element 930, in case of displacement of this cable in the X-direction, accomplishes a rotation of this magnet element 930 about the X-axis.

Further, it is possible that the coupling between the magnet element 930 and the coupling members does not vary continuously as function of the X-position, but in steps, corresponding to different, predetermined work positions of the cable, for example corresponding to mutually different gear positions.

In the preceding, the present invention has been explained for a bicycle wherein both ends of the axle of the rear wheel are attached to a dropout. However, it is also possible that the wheel is attached singlesidedly, i.e. that only one end of the rear axle is coupled with the frame and that the other end is free. In that case, there is only one single dropout that senses the reaction force for the chain force; measuring this reaction force, at least the horizontal component thereof, for example by means of the measuring principles described in the preceding, wherein the vertical weight force does not influence the measuring result, then thus directly supplies the chain force.

The invention claimed is:

1. Dropout with integrated chain force sensor, comprising:
   a frame connecting part intended for connecting to a bicycle frame;
   an axle receiving part intended for connecting to a wheel axle;
   an elastically deformable transition part between the frame connecting part and the axle receiving part;
   and at least one sensor for providing a measuring signal which is indicative of at least one of a mutual displacement between the frame connecting part and the axle receiving part and a deformation of the transition part.

2. Dropout according to claim 1, wherein the elastically deformable transition part comprises at least two substantially vertical legs coupling the axle receiving part to the frame connecting part, which legs, through bending, allow a substantially horizontal displacement of the axle receiving part relative to the frame connecting part, in a direction substantially perpendicular to the longitudinal direction of the axle.

3. Dropout according to claim 1, further provided with at least one deformation sensor for detecting a deformation of the dropout.

4. Dropout according to claim 3, wherein the deformation sensor comprises a substantially vertically directed central body, of which a first end is connected to the frame connecting part f the dropout, and wherein the opposite end is connected to the axle receiving part;
   and wherein a bending sensor is arranged on at least one surface of this central body, which bending sensor preferably comprises at least one strain gauge.

5. Dropout according to claim 1, wherein the axle receiving part is provided with a measuring part coupled to the frame connecting part by means of at least one bending arm, which arm, through bending, allows a substantially horizontal displacement of the axle receiving part relative to the frame connecting part, in a direction substantially perpendicular to the longitudinal direction of the axle;
   and wherein the dropout is provided with detection means for measuring said horizontal displacement.

6. Dropout according to claim 5, wherein the detection means comprise: a magnet element and a magnet sensor, preferably a Hall sensor;
   wherein the magnet element is attached to the axle receiving part while the magnet sensor is attached to the frame connecting part, or wherein the magnet element is attached to the frame connecting part while the magnet sensor is attached to the axle receiving part.

7. Dropout according to claim 6, wherein the magnet sensor has a sensor surface, and wherein the magnet sensor is mounted in such a way that the sensor surface is substantially parallel to the horizontal relative displacement between the magnet element and the magnet sensor.

8. Dropout according to claim 1, further provided with a stop as stroke limitation of the axle receiving part.

9. Dropout according to claim 1, wherein the elastically deformable transition part comprises at least two connecting arms situated substantially vertically above each other, which arms couple the axle receiving part to the frame connecting part, which arms, through bending about a substantially vertical axis, allow a horizontal bending of the axle receiving part relative to the frame connecting part.

10. Dropout according to claim 9, further provided with at least one deformation sensor for detecting a bending of the dropout.

11. Dropout according to claim 10, wherein the deformation sensor comprises a substantially horizontally directed material bridge, of which the one end is connected to the frame connecting part and of which the other end is connected to the axle receiving part;

and wherein a bending sensor is arranged on at least one surface of this material bridge, which bending sensor preferably comprises at least one strain gauge.

12. Dropout according to claim 9, further provided with a substantially horizontally directed measuring lip, of which a free end is fixed relative to the axle receiving part in such a way that, in case of a bending about the said substantially vertical axis, the free end of the measuring lip is subjected to a substantially horizontally directed displacement relative to the frame connecting part.

13. Dropout according to claim 12, wherein the said sensor is adapted for providing a measuring signal that is indicative for the mutual displacement of the free end of the measuring lip and the frame connecting part.

14. Dropout according to claim 13, further comprising a magnet element and a magnet sensor, preferably a Hall sensor, wherein the magnet element is attached to the free end of the measuring lip while the measuring sensor is attached to the frame connecting part, or wherein the magnet element is attached to the frame connecting part while the magnet sensor is attached to the free end of the measuring lip.

15. Dropout according to claim 14, wherein the magnet sensor has a sensor surface, and wherein the magnet sensor is mounted in such a way that the sensor surface is substantially parallel to the horizontal relative displacement between the magnet element and the magnet sensor.

16. Electrically supported bicycle, comprising:
a wheel driven by means of a chain, which wheel is rotatably mounted on an axle which is fixed in a frame at least one connecting point;
a first sensor, arranged at a first one of said connecting points, for providing a measuring signal which is indicative for the reaction force between axle and frame at this first connecting point;
an auxiliary motor;
a controller for energizing the auxiliary motor depending on the chain force accomplished in the drive chain by means of pedal force;
and the dropout according to claim 1;
wherein the controller is adapted for generating a motor energizing signal based on the sensor signal.

17. Electrically supported bicycle, comprising:
a wheel driven by means of a chain, which wheel is rotatably mounted on an axle which is fixed in a frame at least two connecting points;
a first sensor, arranged at a first one of said connecting points, for providing a measuring signal which is indicative for the reaction force between axle and frame at this first connecting point;
a second sensor, arranged at a second one of said connecting points, for providing a measuring signal which is indicative for the reaction force between axle and frame at this second connecting point;
an auxiliary motor;
a controller for energizing the auxiliary motor depending on the chain force accomplished in the drive chain by means of pedal force;
and the dropout according to claim 1;
wherein the controller is adapted for generating the motor energizing signal based on both sensor signals.

18. Electrically supported bicycle according to claim 17, wherein the controller has a first sensor input coupled with the first sensor for receiving the first sensor signal, as well as a second sensor input coupled with the second sensor for receiving the second sensor signal;
and wherein the controller is adapted for generating the motor energizing signal based on the sum of both input signals.

19. Electrically supported bicycle according to claim 17, provided with means for adding both sensor signals in order to obtain an added sensor signal;
wherein the controller has a signal input coupled for receiving the said added sensor signal;
and wherein the controller is adapted for generating the motor energizing signal based on its input signal.

20. Electrically supported bicycle, comprising:
a wheel driven by means of a chain, which wheel is rotatably mounted on an axle which is fixed in a frame at least one connecting point, wherein the wheel is provided with at least two chain wheels on which the drive chain can engage;
a first sensor, arranged at a first one of said connecting points, for providing a measuring signal which is indicative for the reaction force between axle an frame at this first connecting point;
a second sensor for providing a measuring signal indicating which of the chain wheels is in engagement with the drive chain; an auxiliary motor;
a controller for energizing the auxiliary motor depending on the chain force accomplished in the drive chain by means of pedal force;
and the dropout according to claim 1;
wherein the controller is adapted for generating a motor energizing signal based on both sensor signals.

21. Electrically supported bicycle, provided with an auxiliary motor and/or an automatic gear device, wherein the bicycle is provided with at least one dropout according to claim 1.

22. Bicycle, comprising:
a frame and the dropout according to claim 1;
an adjustment cable;
and a measuring device for measuring the position of the adjustment cable relative to the frame, the measuring device comprising:
a housing held relative to the frame;
a magnetic field sensor fixedly connected to the housing;
a magnet element displaceably arranged in the housing, provided with coupling means coupling the magnet element with the cable;
and coupling members for coupling the magnetic field of the magnet element to the magnetic field sensor, which coupling members have a magnetic coupling with the magnetic field sensor on the one hand and a magnetic coupling with the magnet element on the other hand;
wherein the magnetic coupling between the coupling members and the magnet element depends on the position of the magnet element in the housing.

23. Bicycle according to claim 22, wherein the displacement of the magnet element in the housing caused by the adjustment cable comprises a linear displacement in an X-direction, wherein the said coupling members have legs extending along this X-direction, preferably on both sides of the X-axis.

24. Bicycle according to claim 23, wherein the magnet element has a magnet axis directed substantially perpendicular to this X-direction.

25. Bicycle according to claim 22, wherein the legs of the said coupling members have transverse dimensions which vary as function of the X-position, at least along a part of the displacement trajectory of the magnet element.

26. Bicycle according to claim 22, wherein the mutual distance between the legs of the said coupling members varies as function of the X-position, at least along a part of the displacement trajectory of the magnet element.

27. Bicycle according to claim 22, wherein the legs of the said coupling members have a helical appearance, at least along a part of the displacement trajectory of the magnet element.

28. Bicycle according to claim 27, wherein the helical appearance of the legs has a length corresponding to a half helix pitch.

29. Bicycle according to claim 22, wherein the displacement of the magnet element in the housing caused by the adjustment cable comprises a rotation about the X-axis.

30. Bicycle according to claim 29, further comprising guiding means which accomplish a rotation of the magnet element about the X-axis in case of displacement of the magnet element along the X-direction.

31. Bicycle according to claim 22, wherein the displacement of the magnet element in the housing caused by the adjustment cable brings a change in the mutual distance between the magnet element and the magnetic field sensor, and wherein the magnetic coupling between the coupling members and the magnet element decreases with increasing distance between the magnet element and the magnetic field sensor.

32. Bicycle according to claim 22, wherein the housing is attached to the frame.

33. Bicycle according to claim 22, wherein the adjustment cable is of the Bowden type with an outer sheath attached to the frame while the housing is attached to this outer sheath.

34. Dropout with integrated chain force sensor, comprising:
- a frame connecting part intended for connecting to a bicycle frame;
- an axle receiving part intended for connecting to a wheel axle;
- an elastically deformable transition part between the frame connecting part and the axle receiving part;
- at least one deformation sensor for detecting a bending of the dropout;
- and at least one sensor for providing a measuring signal which is indicative of at least one of a mutual displacement between the frame connecting part and the axle receiving part and a deformation of the transition part.
- wherein the elastically deformable transition part comprises at least two connecting arms situated substantially vertically above each other, which arms couple the axle receiving part to the frame connecting part, which arms, through bending about a substantially vertical axis, allow a horizontal bending of the axle receiving part relative to the frame connecting part;
- wherein the deformation sensor comprises a substantially horizontally directed material bridge, of which the one end is connected to the frame connecting part and of which the other end is connected to the axle receiving part;
- and wherein a bending sensor is arranged on at least one surface of this material bridge, which bending sensor preferably comprises at least one strain gauge.

35. Dropout with integrated chain force sensor, comprising:
- a frame connecting part intended for connecting to a bicycle frame;
- an axle receiving part intended for connecting to a wheel axle;
- an elastically deformable transition part between the frame connecting part and the axle receiving part;
- a substantially horizontally directed measuring lip, of which a free end is fixed relative to the axle receiving part in such a way that, in case of a bending about the said substantially vertical axis, the free end of the measuring lip is subjected to a substantially horizontally directed displacement relative to the frame connecting part;
- and at least one sensor for providing a measuring signal which is indicative of at least one of a mutual displacement between the frame connecting part and the axle receiving part and a deformation of the transition part;
- wherein the elastically deformable transition part comprises at least two connecting arms situated substantially vertically above each other, which arms couple the axle receiving part to the frame connecting part, which arms, through bending about a substantially vertical axis, allow a horizontal bending of the axle receiving part relative to the frame connecting part.

36. Dropout according to claim 35, wherein the said sensor is adapted for providing a measuring signal that is indicative for the mutual displacement of the free end of the measuring lip and the frame connecting part.

37. Dropout according to claim 36, further comprising a magnet element and a magnet sensor, preferably a Hall sensor, wherein the magnet element is attached to the free end of the measuring lip while the measuring sensor is attached to the frame connecting part, or wherein the magnet element is attached to the frame connecting part while the magnet sensor is attached to the free end of the measuring lip.

38. Dropout according to claim 37, wherein the magnet sensor has a sensor surface, and wherein the magnet sensor is mounted in such a way that the sensor surface is substantially parallel to the horizontal relative displacement between the magnet element and the magnet sensor.

39. Dropout with integrated chain force sensor, comprising:
- a frame connecting part intended for connecting to a bicycle frame;
- an axle receiving part intended for connecting to a wheel axle;
- an elastically deformable transition part between the frame connecting part and the axle receiving part;
- and at least one sensor for providing a measuring signal which is indicative of at least one of a mutual displacement between the frame connecting part and the axle receiving part and a deformation of the transition part;
- wherein when the dropout is connected to a bicycle frame and a wheel axle, the entire dropout is stationary with the frame, frame connecting part being directly and fixedly connected to the frame and the axle receiving part being directly and fixedly connected to the wheel axle.

40. A vehicle comprising:
- a frame;
- a wheel axle; and
- a dropout with integrated chain force sensor, the dropout comprising:
  - a frame connecting part connected to the frame;
  - an axle receiving part connected to the wheel axle;
  - an elastically deformable transition part between the frame connecting part and the axle receiving part;
  - and at least one sensor for providing a measuring signal which is indicative of at least one of a mutual displacement between the frame connecting part and the axle receiving part and a deformation of the transition part.

* * * * *